(No Model.)
W. & W. A. WILCOX.
VALVE.
No. 407,047. Patented July 16, 1889.
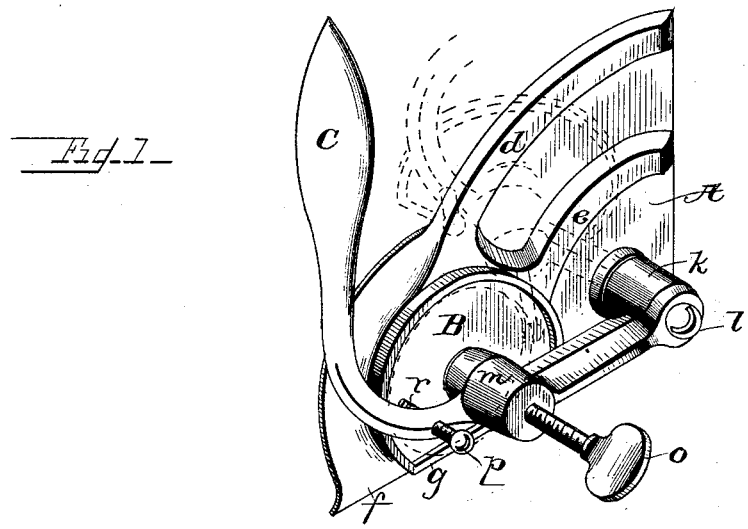
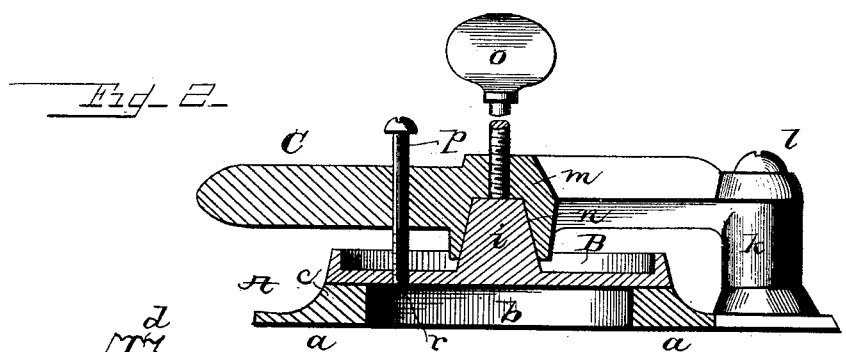
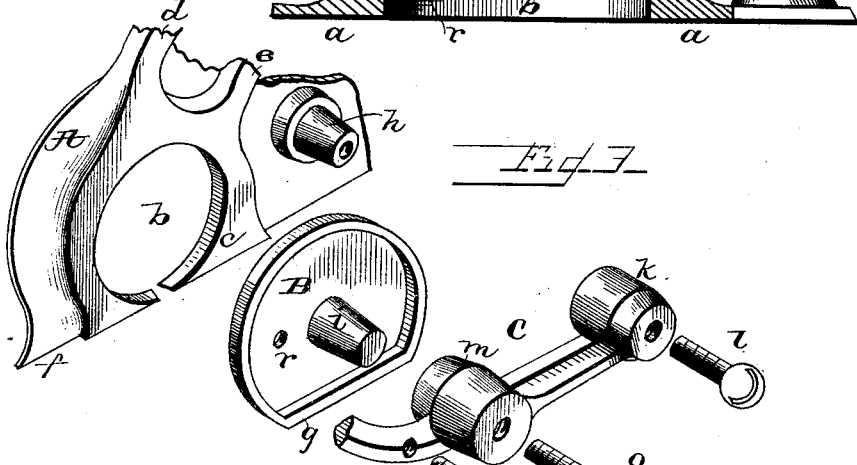
Witnesses
G. A. Fauberschmidt
L. B. Whitaker
Inventor
Wm. Wilcox
Wm. A. Wilcox
By their Attorneys
Johnston, Reinohl & Dye

UNITED STATES PATENT OFFICE.

WILLIAM WILCOX AND WILLIAM ALARIC WILCOX, OF GRAND RAPIDS, MICHIGAN.

VALVE.

SPECIFICATION forming part of Letters Patent No. 407,047, dated July 16, 1889.

Application filed February 26, 1889. Serial No. 301,283. (No model.)

*To all whom it may concern:*

Be it known that we, WILLIAM WILCOX and WILLIAM ALARIC WILCOX, citizens of the United States, residing at Grand Rapids, in the county of Kent and State of Michigan, have invented certain new and useful Improvements in Valves; and we do hereby declare the following to be a full, clear, and exact description of the invention, such as will enable others skilled in the art to which it appertains to make and use the same.

Our invention relates to valves, and has for its object an improvement in the class of sliding gate-valves employed in connection with evaporating-pans for drawing sirup from one compartment thereof into another.

The invention will be hereinafter described, and particularly pointed out in the claims.

In the accompanying drawings, which form part of this specification, Figure 1 is a perspective view showing the valve in open and closed positions; Fig. 2, a sectional view through the base, the valve, and the opening-lever; and Fig. 3, a detail perspective.

Reference being had to the drawings and the letters thereon, A indicates the base or plate, which is provided with a plain back or rear surface $a$, adapted to be secured to or against a vertical wall or partition in an evaporating-pan or a tank for other purposes by soldering it thereto. The base may, however, be secured in position by screws or rivets. To provide for attaching the base by solder, and to protect it against corrosion, it is made of brass or composition, and is coated with tin, and the valve is made in the same manner. The base is provided with a discharge-aperture $b$, and around it is formed a raised seat $c$, from which extend raised ways $d\ e$ for the disk-valve B to slide upon and keep it in alignment with the seat.

In order to adapt the valve to discharge all of the contents of one compartment into another, the base is formed with a straight lower edge $f$, which cuts into the aperture $b$ slightly, as shown, and the valve B is cut off at $g$ to correspond therewith. Upon the base A is also formed a conical post $h$, and upon the back of the disk-valve B is formed a similar stud $i$. C indicates a lever for operating the valve, and is provided at its inner end with a boss $k$, which is provided with a cavity which corresponds with the post $h$, and the lever is secured to said post by a screw $l$ and swings thereon, as shown in dotted lines in Fig. 1. The lever is also provided with a boss $m$, which has a cavity $n$ in it corresponding with the stud $i$ on the valve B, and engages therewith for the purpose of moving the valve.

The valve B is forced to its seat $b$ to make a fluid-tight joint and to secure it in any desired position by means of a thumb-screw $o$, which engages with the lever C and bears upon the end of the stud $i$, as shown in Fig. 2.

To prevent the valve from changing its relative position to the base A, a screw $p$ passes through the lever and engages with a screw-threaded aperture $r$ in the valve, as shown in Fig. 2.

Having thus fully described our invention, what we claim is—

1. As an article of manufacture, a valve consisting of a plate or base having a discharge-aperture and provided with a plain flat rear surface, and a raised seat and ways on the opposite side, and a valve pivotally secured thereto, substantially as described.

2. As an article of manufacture, a valve consisting of a plate or base having a straight lower edge and a discharge-aperture, a disk having a surface corresponding with the lower edge of the base, and a boss on its outer side, in combination with a lever secured to a boss on the base and on the valve, substantially as described.

3. As an article of manufacture, a valve consisting of a plate or base having a discharge-aperture, a disk, an arm or lever attached to the base at the rear end of the arm and engaging with a boss on the disk, and a screw passing through the lever and into the disk for preventing the disk from revolving in the lever, substantially as described.

In testimony whereof we affix our signatures in presence of two witnesses.

WILLIAM WILCOX.
WILLIAM ALARIC WILCOX.

Witnesses:
GEO. SNYDER,
C. W. YATES.